United States Patent
Murthy et al.

(10) Patent No.: US 9,876,738 B2
(45) Date of Patent: Jan. 23, 2018

(54) SYSTEM AND METHOD FOR EXTENDING PORTS

(71) Applicant: DELL PRODUCTS L.P., Round Rock, TX (US)

(72) Inventors: Shree Murthy, San Jose, CA (US); Pugalendran Rajendran, TamilNadu (IN); Ravikumar Sivasankar, Chennai TamilNadu (IN); Kannan Narayanan, Fremont, CA (US)

(73) Assignee: Dell Products L.P., Round Rock, TX (US)

(*) Notice: Subject to any disclaimer, the term of this patent is extended or adjusted under 35 U.S.C. 154(b) by 533 days.

(21) Appl. No.: 14/512,336

(22) Filed: Oct. 10, 2014

(65) Prior Publication Data

US 2016/0105379 A1    Apr. 14, 2016

(51) Int. Cl.

| | | |
|---|---|---|
| G01R 31/08 | (2006.01) | |
| H04L 12/28 | (2006.01) | |
| H04L 12/935 | (2013.01) | |
| H04L 29/06 | (2006.01) | |
| H04L 12/721 | (2013.01) | |
| H04L 12/741 | (2013.01) | |

(52) U.S. Cl.
CPC ........ H04L 49/3009 (2013.01); H04L 45/566 (2013.01); H04L 45/745 (2013.01); H04L 69/22 (2013.01)

(58) Field of Classification Search
CPC .......... H04L 49/65; H04L 51/14; H04L 69/22
See application file for complete search history.

(56) References Cited

U.S. PATENT DOCUMENTS

| | | | |
|---|---|---|---|
| 2006/0215582 A1* | 9/2006 | Castagnoli | H04L 45/02 370/254 |
| 2008/0049619 A1* | 2/2008 | Twiss | H04L 45/04 370/236 |
| 2010/0316053 A1* | 12/2010 | Miyoshi | H04L 45/00 370/392 |
| 2013/0016723 A1* | 1/2013 | Arad | G06F 9/45558 370/392 |
| 2013/0058354 A1* | 3/2013 | Casado | H04L 12/4633 370/401 |
| 2013/0243003 A1* | 9/2013 | Oda | G06F 12/14 370/401 |

(Continued)

Primary Examiner — Faruk Hamza
Assistant Examiner — Abu-Sayeed Haque
(74) Attorney, Agent, or Firm — Haynes and Boone, LLP

(57) ABSTRACT

A system and method includes a first switching device that includes a first control unit with a first and third port coupled to the first control unit and a second switching device that includes a second control unit with the a second port coupled to the second control unit. The system and method may include a network link coupling the first and second switching devices. The first control unit configured to receive a data packet and adding a drop indication. The second control unit configured to detect the drop indication. In some embodiments the first control unit is configured to apply a rule, and mark a data packet with a drop indication in a header, the header being a header normally attached to the data packet. The second switching device may interpret the drop indication with a set of rules to determine a course of action.

20 Claims, 6 Drawing Sheets

(56) References Cited

U.S. PATENT DOCUMENTS

| | | | |
|---|---|---|---|
| 2013/0259067 A1* | 10/2013 | Agmon | H04L 41/0896 370/468 |
| 2015/0103826 A1* | 4/2015 | Davis | H04L 49/25 370/392 |
| 2015/0195178 A1* | 7/2015 | Bhattacharya | H04L 45/745 718/1 |
| 2016/0021014 A1* | 1/2016 | Wetterwald | H04L 47/2441 370/235 |

* cited by examiner

| | | |
|---|---|---|
| 401 | EtherType (16 bits) = 0x893f | |
| 402 PCP (3 Bits) | 403 DEI (1 Bit) | 404 Ingress ECID-base (12 bits) |
| 405 Res (2 Bits) | 406 GRP (2 Bits) | 407 Egress ECID-base (12 bits) |
| 408 Ingress ECID-ext (8 bits) | | 409 Egress ECID-ex (8 bits) |

SYSTEM AND METHOD FOR EXTENDING PORTS

BACKGROUND

The present disclosure relates generally to information handling systems, and more particularly devices, systems, and methods to increasing port support of networking devices.

As the value and use of information continues to increase, individuals and businesses seek additional ways to process and store information. One option is an information handling system (IHS). An IHS generally processes, compiles, stores, and/or communicates information or data. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling many types of communication and information, which is constantly growing. Making this possible is a vast array of network switching products that make forwarding decisions in order to deliver packets of information from a source system or first network node to a destination system or second network node. As these networks grow, the vast array of network switching products must increase in scale.

Accordingly, it would be desirable to have systems, methods, and products that can aid in the scalability of network switching products.

SUMMARY

According to an exemplary embodiment, a network switching device includes a control unit, a first port coupled to the control unit and configured to couple the network switching device to a first device using a first network link, a second port coupled to the control unit and configured to couple the network switching device to a second device using a second network link. The control unit is configured to receive a data packet from the second port, identify an address related to the data packet, crosscheck the address with a list, and append a header to the data packet, the header including data that represents the results of the crosscheck. In some embodiments, the network switching device is a port extender. In some embodiments, the first device is a controlling bridge. In some embodiments, the first port is an uplink port specifically for coupling to the controlling bridge. In some embodiments, the header is based on the IEEE 802.1BR protocol. In some embodiments, the list is an access control list. In some embodiments, the data that represents the results of the crosscheck is an indication to drop the data packet. In some embodiments, the control unit is configured to receive instructions provided by the controlling bridge from the first port and modify the list based on the instructions.

According to another exemplary embodiment, a network switching device includes a control unit, a port coupled to the control unit and configured to couple the network switching device to a device using a network link. The control unit is configured to receive a data packet from the port, determine whether a preliminary drop indication is provided in a header of the data packet, identify an address related to the data packet, determine whether the address is part of a list, and drop the data packet when the address is not part of the list. In some embodiments, the network switching device is a controlling bridge. In some embodiments, the header of the data packet is based on the IEEE 802.1BR protocol. In some embodiments, the control unit is configured to checks the egress ECID data field of the header to determine whether a preliminary drop indication is provided by a subordinate switch in the header of the data packet. In some embodiments the control unit is configured to determine whether the data packet was sent by a subordinate switch. In some embodiments, the control unit is configured to determine whether the data packet was sent by a subordinate switch by reading a EtherType data field in a header of the data packet.

According to yet another exemplary embodiment, an information handling system includes a first port of a subordinate switch coupled to a second port of a parent switch by a network link. The subordinate switch includes a first control unit coupled to the first port and a third port. The first control unit is configured to receive a data packet from the third port, identify an address related to the data packet, crosscheck the address with a first list, create a header including data that represents the results of the crosscheck, create a new data packet which includes the header and the data packet, and send the data packet to the parent switch. The parent switch comprising a second control unit coupled to the second port. The second control unit is configured to receive the data packet from the second port, determine whether a preliminary drop indication is provided in the header of the data packet identify the address related to the data packet, determine whether the address is part of a second list, and drop the data packet when the address is not part of the second list. In some embodiments, the header is based off of the IEEE 802.1BR protocol. In some embodiments, the data that represents the results of the crosscheck is held in the egress ECID or the egress ECID-ext data field of the header. In some embodiments, the first control unit is configured to receive configuration data from the first port. In some embodiments the entries of the first list and the second list are a plurality data traffic rules. In some embodiments, the entries of the first list and the second list are different.

BRIEF DESCRIPTION OF THE DRAWINGS

FIG. 4 shows a simplified diagram of a header based on the IEEE 802.1BR protocol according to some embodiments.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
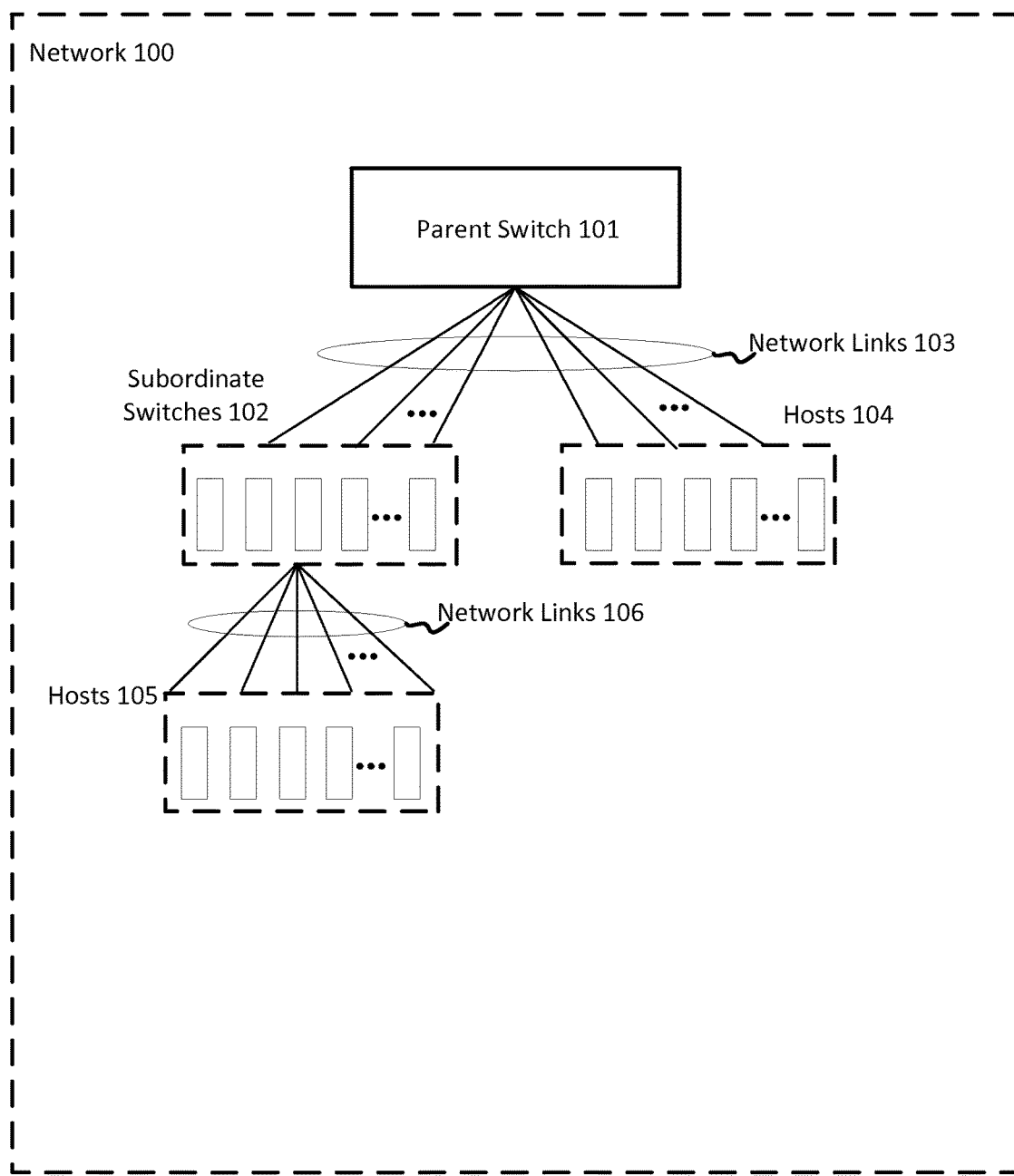
FIG. 1 shows a simplified diagram of a network for enabling connectivity between devices according to some embodiments.

FIG. 1 shows a simplified diagram of a network 100 for enabling connectivity between devices according to some embodiments. Network 100 may interconnect one or more network enabled devices and/or network connections through one or more network switching devices. For the purposes of this disclosure, a network switching device includes devices such as a network switch, a router, a hub, a bridge, and/or any other device that can be utilized to interconnect devices or networks to other devices or networks. Network 100 may use a switching hierarchy which includes a parent switch and a subordinate switch. This network formation is sometimes referred to as a distributed switching architecture. One of the advantages of this architecture is the ability to scale the number of available ports. Generally, the number of ports a switch contains limits the number of devices the switch can connect to. However, by coupling a port on a parent switch to a subordinate switch, the coupled port on the parent switch may expand to the number of ports contained on the subordinate switch. In some examples, this may effectively increases the number of devices that may be coupled to the parent switch.

Using subordinate switches to expand the number of ports on a parent switch is desirable for several reasons. For example, additional port support may allow easy scalability of a network. Also, having a single parent switch handle several ports may allow for a single point for management rather than multiple coordinating parent switches. In some examples, because subordinate switches may not perform certain functions, such as forward lookups, costs may be reduced by using a cheaper lower functioning switch. There may also be additional cost savings from reduced power consumption, reduced cabling, and/or architectural flexibility. Thus, the ability to expand port support on a parent switch by using subordinate switches may be highly desirable.

In some embodiments, network 100 may utilize a parent switch 101 that is coupled to one or more subordinate switches 102. In some embodiments, parent switch 101 may be a controlling bridge. In some embodiments, one or more subordinate switches 102 may be port extenders. Network links 103 may couple respective ports on one or more subordinate switches 102 to respective ports on parent switch 101. Network links 103 may also couple one or more ports on one or more hosts 104 to respective ports on parent switch 101. Similar to the coupling between parent switch 101 and hosts 104, the respective ports on one or more subordinate switches 102 may be coupled to their respective ports on hosts 105 through network links 106. With the hierarchy of network 100, network links 103 (coupled between parent switch 101 and one or more subordinate switches 102) may act as trunks for network links 106 (branches). Although network 100 depicted in FIG. 1 utilizes a single parent switch, other embodiments may utilize additional parent switches which may also be coupled to one or more subordinate switches 102, hosts 104, and/or hosts 106.

One or more subordinate switches 102 may be configured to pass data packets from hosts 105 up through network links 103 to parent switch 101. In some embodiments, one or more subordinate switches 102 may add additional information to the data packets from hosts 105 before passing them to parent switch 101. In some examples, this additional data may be information that allows parent switch 101 to differentiate data packets coming from different devices that make up hosts 105 and direct the data packets to their appropriate destinations. In some embodiments, one or more subordinate switches 102 may insert the additional information into the data packets. In other embodiments, one or more subordinate switches 102 may append the additional data to the data packet. In some embodiments, one or more subordinate switches 102 may modify unused, unnecessary, and/or redundant portions of a data packet to include the additional information.

In some embodiments, the additional information may be a header that one or more subordinate switches 102 use to encapsulate the data packets. In some examples, the header may include additional fields. These fields may sometimes be referred to as tags. In some examples, the header may use or be based off of a protocol, such as the IEEE 802.1BR protocol.

Although using a subordinate switch increases the number of ports and interfaces in which additional devices may couple to a parent switch, it is not the only limiting factor preventing a parent switch from coupling with additional devices. Another limiting factor may be the number of access control list (ACL) entries that the parent switch may support. An ACL is also sometimes referred to as a field processor (FP). In some examples, ACLs are a subset of rules that network switching devices may apply to manage network traffic. In some embodiments, there may be a set of rules that are applied by the parent and/or subordinate switches to data packets passing through the network. In some embodiments, the rules may be applied based on a data packet's source, intermediate source, and/or destination addresses, including, but not limited to, addresses such as a receiving port, originating port, intermediate port, destination port, destination address(es), and/or originating address(es). In some embodiment, the rule may be based on other information or data in the data packet, including, but not limited to, a quality of service indicator, packet size, communications protocol, and any other data that the data packet may contain. In some embodiments, a switch or other device may retrieve this information from a data packet through deep packet inspection. In some embodiments, deep packet inspection may be performed by looking at the internal headers and/or bodies of the messages, packets, and/or datagrams included in a data packet for specific types of header field types and/or values as well as payload patterns. In some examples, the deep packet inspection may include examining the headers and bodies of layer 4 (e.g., Transmission Control Protocol (TCP)) and layer 5 (e.g., application) packets and/or datagrams. In some examples, the deep packet inspection may detect the headers for a communications protocol. In some examples, when a specific protocol is being used, the deep packet inspection may detect the headers for the specific protocol and extract an address and/or other information to be considered by an ACL from its designated field in the header.

In some embodiments, the rules that network switching devices apply may control the access, route, and/or destination of a data packet. In some examples, these rules may also have differing levels of priorities that may resolve conflicting rules. In some examples, these rules may include internal rules (sometimes referred to as system flows or system rules) and/or user configured rules (sometimes referred to as user rules). Generally, internal rules have a higher priority than user configured rules and overrule the user configured rules when conflicts occur between the internal rules and the user configured rules. Because of these priorities, internal rules are usually applied by the parent switch to maintain rule conformity over all switches.

In some examples, some of the rules may involve the network switching device conducting forward lookups based on the forwarding lookup information (usually held in a forwarding table). In many cases, the subordinate switch, such as the port extender, may be unable to conduct forward lookups because it does not make forwarding decisions or maintain forwarding tables; therefore, the parent switch is often set to manage all of the forward lookup rules. Rules that may involve forward look ups may require layer 2 lookups such as MAC address lookups, and/or Layer 3 lookups such as IP address lookups. In some examples, ACLs are a subset of rules that do not involve any forward lookups and may be managed by a subordinate switch. In some embodiments, rules in the ACL may be based on information such as the IP source, IP destination, protocol, destination protocol port, and/or source protocol port. In some embodiments the destination protocol ports and source protocol ports may include TCP and/or UDP ports.

Because of the differing levels of priorities between the internal ACLs and the user ACLs, the parent switch may apply the ACLs to maintain conformity. In some examples, the number of ACL entries in the parent switch may be limited. In some embodiments, each switching entity may be limited to 4,000 rules. This rule limit may not scale up to a maximum number of ports that a combination of a parent switch and multiple subordinate switches combination are able to support. Therefore, it would be desirable for network switching devices that allow for the distributed processing of rules while still maintaining consistent and orderly forwarding of network data traffic.

In some embodiments, parent switch 101 may be configured such that rules that do not involve looking up forwarding table information or are not specific to parent switch 101 may be pushed down to and/or held on one or more subordinate switches 102. An exemplary rule that may not involve looking up forwarding table information may be an ACL rule that requests a packet to be dropped with a source IP address of 1.1.1.1. Other rules that may be pushed down to and/or held on one or more subordinate switches 102 may include user configuration ACLs pertaining to ports on one or more subordinate switches 102 and non-port specific ACLs. However, the parent switch 101 may maintain ACL rules, and any other rules, that are related to or are specifically applicable to the ports on parent switch 101 or require forward lookups. An exemplary rule that may be held on and/or handled by the parent switch 101 may be a rule such as: all multicast packets which match an entry in the L3 forwarding table must be sent to the CPU. Another example of a rule that may be held on and/or handled by the parent switch 101 may be the following, forward packets with a destination IP address of 2.2.2.2. These rules may be held on parent switch 101 because these rules require forwarding, which one or more subordinate switch 102 may be incapable of. Additional rule categories that may be held on parent switch 101 may include, but are not limited to, station move rules, network layer or layer 3 (L3) terminated traffic rules, and handling of messages with addresses unresolved by the address resolution protocol (ARP).

In some embodiments, parent switch 101 and one or more subordinate switches 102 may be configured such that rules that do not involve looking up forwarding table information and/or rules that are not specific to parent switch 101 reside in one or more subordinate switches 102 and may remain absent from parent switch 101. With one or more subordinate switches 102 maintaining some of the rules natively, parent switch 101 may be free to accept additional ACL entries. In some examples, having configured parent switch 101 and one or more subordinate switches 102 to share some of the burden of ACL entries, the number of additional ports that the parent switch may be able to support through subordinate switches, such as a port extender, may increase.

In some embodiments, when one or more subordinate switches 102 determines that one of its natively held rules, such as an entry in an ACL, indicates that a packet should be denied access or dropped, one or more subordinate switches 102 may pass the packet up to parent switch 101 with a preliminary drop indication. In some embodiments, one or more subordinate switches 102 may insert into, append, and/or modify the data packet with the preliminary drop indication before passing it to parent switch 101. In some embodiments, this allows for one of more subordinate switches 102 to handle some of the data traffic rules, which may reduce the burden on parent switch 101. In some embodiments, by having one or more subordinate switches 102 pass a preliminary drop indicator rather than dropping the packet, parent switch 102 may maintain centralized control over the data traffic and/or resolve priority conflicts between the rules in parent switch 101 and one or more subordinate switches 102.

In some embodiments, one or more subordinate switches 102 may insert the preliminary drop indication into a tag and/or header of a communications protocol, and/or a protocol such as the IEEE 802.1BR protocol. In some embodiments, one or more switches 102 may generate the header and/or tag of the communications protocol. In some examples one or more subordinate switches 102 may then encapsulate the data packet with the header and/or tag before communicating the data packet to parent switch 101.

In some embodiments, the preliminary drop indication may communicate to parent switch 101 that one or more rules on one or more subordinate switches 102 indicate that the accompanying data packet should be dropped. In some embodiments, the preliminary drop indication may communicate that a potentially lower priority drop rule applies to the accompanying data packet. In some embodiments, when one or more subordinate switches 102 creates a header and/or tag for an incoming data packet, one or more subordinate switches 102 may record the port on which one or more switches 102 received the data packet (the ingress port) in a data field of the header and/or tag.

In some embodiments, this data field may be the ingress ECID and/or ingress ECID-ext data field used by the IEEE 801.2BR protocol. In some embodiments, one or more subordinate switches 102 may assign a data field for an egress destination of the data packet. In some embodiments this data field may be the egress ECID and/or the egress ECID-ext data field used by the IEEE 801.2BR protocol. In some embodiments, parent switch 101 may assign or populate the egress destination data field. Therefore, in some embodiments, when one or more subordinate switches 102 initially communicates a data packet with the header and/or tag to parent switch 101, the egress destination data field may be unused. Because the egress destination data field may be unused, one or more subordinate switches 102 may use the egress destination data field to contain the preliminary drop indication. In some embodiments, the destination data field may be the egress ECID and/or the egress ECID-ext used by the IEEE 801.2BR protocol. In some embodiments, one or more unused fields and/or unused portions of a field may be used to communicate a preliminary drop indication to parent switch 101.

Figure 2:
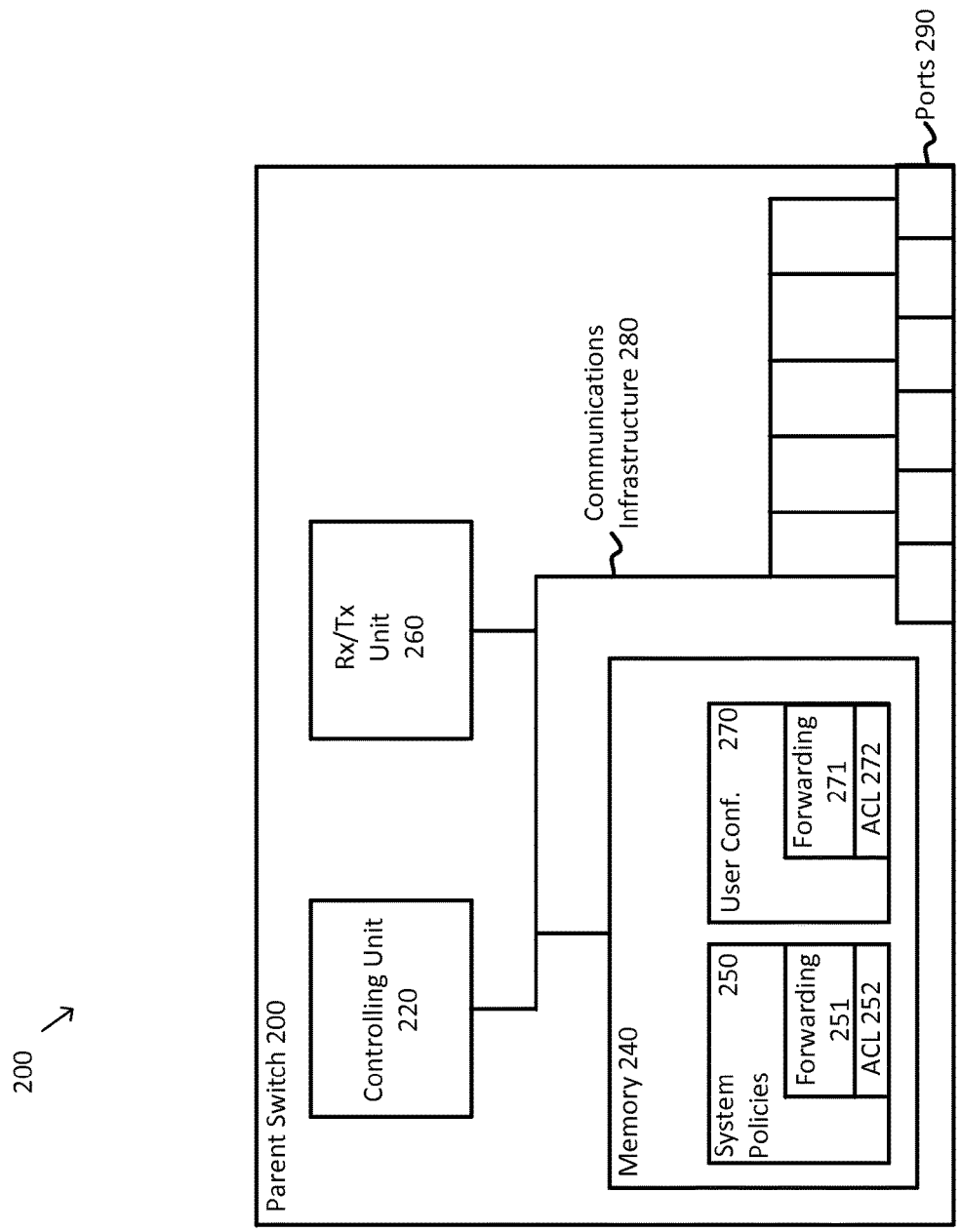
FIG. 2 shows a simplified diagram of a parent switch according to some embodiments.

FIG. 2 shows a simplified diagram of an exemplary parent switch 200, according to some embodiments. In some examples, parent switch 200 may be parent switch 101. In some embodiments, parent switch 200 may be a controlling bridge. As shown in FIG. 2, parent switch 200 may include a control unit 220, a memory 240, a receive/transmit (Rx/Tx) unit 260, communications infrastructure 280, and one or more ports 290. Control unit 220 may be coupled to memory 240, Rx/Tx unit 260, and ports 290 by communication infrastructure 280 and may control the operation of parent switch 200. In some examples, control unit 220 may make forwarding decisions for network traffic that parent switch 200 receives. In some examples, control unit 220 may include one or more processors, central processing units, microprocessors, microcontrollers, multi-core processors, field programmable gate arrays (FPGAs), application specific integrated circuits (ASICs), and/or the like. Communication infrastructure 280 may include one or more interconnected bus structures or other interconnections that communicatively couple the various components within parent switch 200. One or more ports 260 may couple parent switch 200 to other switches, servers, and/or other devices using network links. In some examples, control unit 220 may use one or more protocols to communicate with the other switches and network devices using one or more ports 280 and network links. Memory 240 may include one or more machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. Memory 240 may store one or more modules or applications and their corresponding data structures. In some embodiments, the one or more applications may be implemented using software and/or a combination of hardware and software. In some examples, the applications, when implemented, may perform one or more methods of data packet handling, including, but not limited to, the methods discussed in the present disclosure.

In some embodiments, network switching rules may be stored in memory 240. In some examples, these rules may include system policies 250 and/or user configuration rules 270. In some examples, system policies 250 may include rules 251 that involve looking up information from forwarding tables. In some examples, system policies 250 may also involve ACLs 252. Similarly, user configuration rules 270 may include rules 271 that involve looking up information from forwarding tables. User configuration rules 270 may also maintain an ACL 272 that a user configures. Though the system policies 250 and user configuration rules 270 are depicted in FIG. 2 as separate, they may be combined or separated in several other manners. In some embodiments, the forwarding tables for the system policies 250 and user configuration rules 270 may be combined in a single table or mixed in more than one table. System policies 250 and user configuration rules 270 may be viewed as a categorization of one or more rules that may be held together in one or more ACLs and/or forwarding tables.

In some embodiments, parent switch 200 may be configured to detect and determine whether one or more of the ports 290 are connected to a subordinate switch. In some embodiments, parent switch 200 may detect a subordinate switch by the communications protocol that parent switch 200 receives on one or more ports 290. In some examples, parent switch 200 may determine that a port is connected to a subordinate switch when parent switch 200 receives a payload encapsulated in a data packet conforming to IEEE 802.1BR protocol. In some embodiments, a user may configure parent switch 200 to automatically detect whether one or more of the ports 290 are connected to a subordinate switch. In some examples, parent switch 200 may be coupled to one or more interfaces such that a user may input commands that set one or more of the ports 290 as connections to a subordinate switch. One of ordinary skill in the art would recognize the many different ways in which a parent switch 200 may be configured to dedicate ports or configure ports for connections to a subordinate switch, all of which are contemplated herein.

In some embodiments, parent switch 200 may be configured to push one or more data traffic rules to a subordinate port. In some embodiments, the data traffic rules may be entries in an ACL such as ACL 252 and 272. In some embodiments, parent switch 200 may push lower priority rules down to the subordinate switches. In some embodiments, parent switch 200 may push rules that do not involve looking up forward table information to subordinate ports. In some embodiments, parent switch 200 may push rules down to the subordinate switches in cases where the rules are both lower priority and do not involve looking up forward table information. In some embodiments, parent switch 200 may be configured to push a subset of rules down to the subordinate switches. In some embodiments, parent switch 200 may push select rules based on the configurations of a connecting subordinate switch and/or based on the capabilities of the connecting subordinate switch. Parent switch 200 may select rules for pushing to one or more subordinate switches to maximize switch decision efficiency for the number of ports that the one or more connected subordinate switches support. In one example, parent switch 200 may only push rules to one or more subordinate switches when the number of rules that parent switch 200 can handle is at capacity. In some examples, this may be when one or more ACLs, such as ACL 252 and 272, are at capacity. As will be apparent from the discussions below, maintaining maximum rule capacity in parent switch 200 may reduce the number of preliminary drop indicators that one or more subordinate switches may communicate.

In some embodiments, parent switch 200 may ensure that there are no duplicate rules between parent switch 200 and the one or more subordinate switches. In some embodiments, parent switch 200 may relay rules from a subordinate switch to another subordinate switch. In some embodiments, parent switch 200 may only relay rules from one subordinate switch to another subordinate switch when configuring a subordinate switch.

In some embodiments, instead of parent switch 200 automatically handling some of the configurations of the subordinate switches, a user may manually configure one or more of the subordinate switches. In some embodiments, parent switch 200 may allow a user to configure the parent and subordinate switch from an interface with parent switch 200. In some embodiments, parent switch 200 may relay some or all of a user's configurations to one or more subordinate switches.

Figure 3:
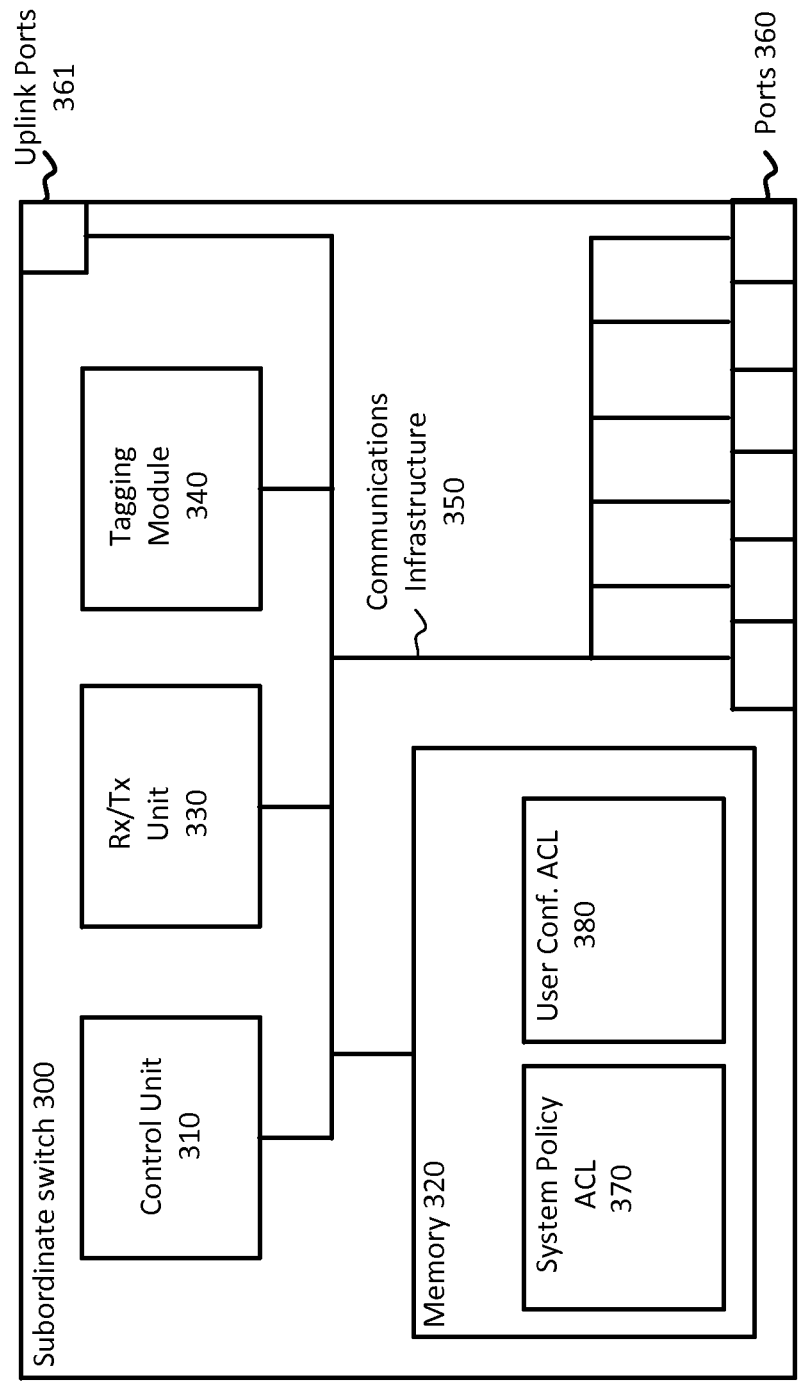
FIG. 3 shows a simplified diagram of a subordinate switch according to some embodiments.

FIG. 3 shows a simplified diagram of an exemplary subordinate switch 300, according to some embodiments. In some embodiments, subordinate switch 300 may be one or more of one or more subordinate switches 102 in FIG. 1. In some embodiments, subordinate switch 300 may be a port extender. As shown in FIG. 3, subordinate switch 300 may include a control unit 310, a memory 320, a receive/transmit (Rx/Tx) unit 330, a tagging module 340, communications infrastructure 350, one or more ports 360, and one or more uplink ports 361.

Control unit 310 may be coupled to memory 320, Rx/Tx unit 330, tagging module 340, ports 360 and uplink port 361 by communication infrastructure 350 and may control the operation of subordinate switch 300. In some examples, control unit 310 may include one or more processors, central processing units, microprocessors, microcontrollers, multi-core processors, field programmable gate arrays (FPGAs), application specific integrated circuits (ASICs), and/or the like. Communication infrastructure 350 may include one or more interconnected bus structures or other interconnections that communicatively couple the various components within subordinate switch 300. In some examples, control unit 310 may use one or more protocols to communicate with the other switches and network devices using one or more ports 360 and/or uplink ports 361 and network links. Memory 320 may include one or more machine readable media. Machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. Memory 320 may store one or more modules or applications and their corresponding data structures. In some embodiments, the one or more applications may be implemented using software and/or a combination of hardware and software. In some examples, the applications, when implemented, may perform one or more methods of data packet handling, including, but not limited to, the methods discussed in the present disclosure.

In some embodiments, network switching rules may be stored in memory 320. These rules may include system policy ACLs 370 and/or user configuration ACLs 380. In some embodiments, subordinate switch 300 may be unable to manage rules that involve looking up forwarding table information.

In some embodiments, one or more ports 360 may be coupled to various host systems, servers, switches, and/or other network devices using network links. One or more uplink ports 361 may couple subordinate switch 300 to other switches, such as a parent switch or a controlling bridge using a network link. In some embodiments, system ACLs 370 and/or user configuration ACLs 380 may be populated by users and/or by communications from one or more coupled parent switches. In some embodiments, uplink ports 361 may be configured to receive configuration instructions from a parent switch which may include instructions that modifies ACLs 370 and/or 380 on subordinate switch 300.

Tagging module 340 may be a module that creates a tag and/or headers. In some embodiments, control unit 310 may instruct tagging module 340 to add additional information to a data packet. In some embodiments, subordinate switch 300 may be configured to use tagging module 340 to encapsulate a data packet using a communication protocol which include a tag and/or header. The protocol may be based off of a protocol such as the IEEE 802.1BR protocol.

FIG. 4 shows a simplified diagram of a Header 400 based on the IEEE 802.1BR protocol according to some embodiments. In some embodiments, one or more subordinate switches 102 and/or parent switch 101 may implement this protocol. Header 400 may include a 16 bit EtherType 401. EtherType 401 may provide a value or code that indicates the protocol that is being used. For example, 0x893f indicates the use of the IEEE 802.1BR protocol. Header 400 may include a 3-bit priority field PCP 402 for indicating the priority of the packet. Header 400 may also include a DEI bit 403. DEI bit 403 may be a single bit that indicates whether the data packet is drop eligible from quality of service (QoS). Header 400 may have an ingress extended channel identifier (ECID) field 404. Ingress ECID 404 may be a 12 bit data field. In some embodiments the ingress ECID 404 data field may be used to uniquely identify an address, such as the port in which a subordinate switch received a data packet. Header 400 may also have a 2 bit reserve 405 and 2 bit group or multicast address field 406. Header 400 may also include an egress ECID 407. Egress ECID 407 may be a 12 bit data field. In some embodiments, Egress ECID 407 may be used to uniquely identify an address such as a port on a subordinate switch for sending the data packet out. In some embodiments, the Egress ECID 407 remains unused until a switch, such as a parent switch 101 and/or 200, determines the outbound route, port, and/or address of the accompanying data packet. Header 400 may also include an ingress ECID-ext field 408 and egress ECID-ext field 409. Ingress ECID-ext 408 and egress ECID-ext 409 may each be 8 bit data fields which extend the number of address and/or ports that header 400 may uniquely identify. In some examples, some switches may not support the ECID-ext data fields.

Referring back to FIG. 1, one or more subordinate switches 102, when attaching header 400 to a data packet, may use the Egress ECID 407 and/or Egress ECID-ext field 409 for communicating a preliminary drop indication. In some embodiments, one or more subordinate switches 102 may use the Egress ECID 407 and/or Egress ECID-ext field 409 for communicating a preliminary drop indication because these fields may remain unused until they are populated by a parent switch, such as parent switch 101.

Figure 5:
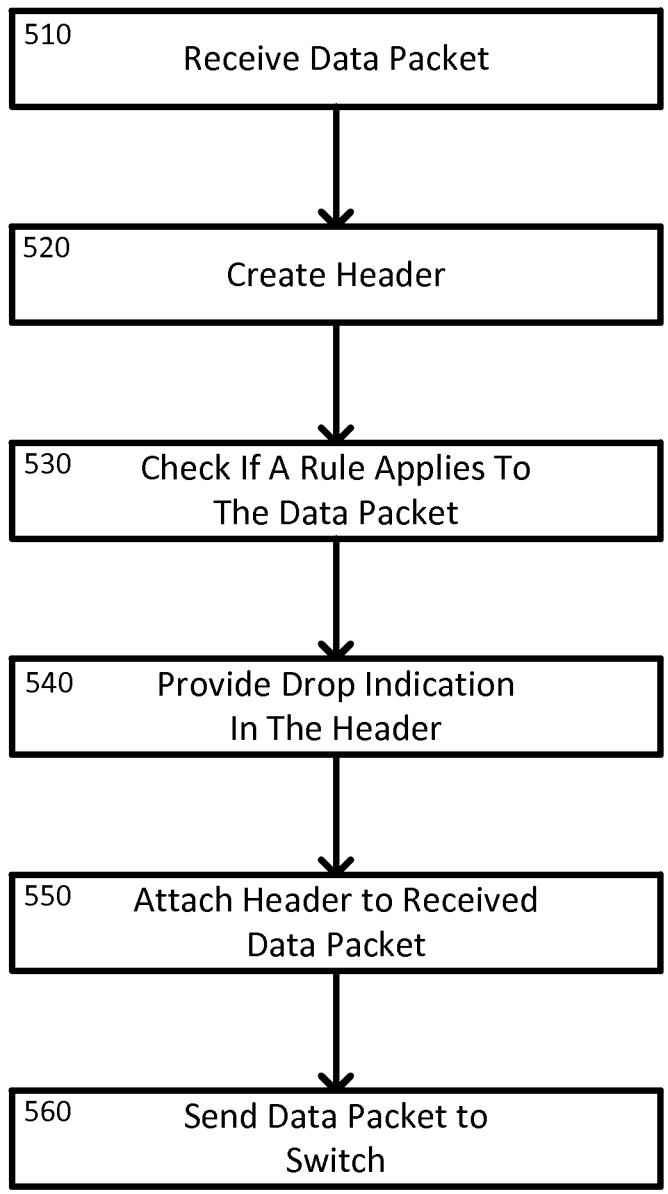
FIG. 5 shows a flow chart illustrating a method that may be included in a method of communicating a data packet according to an embodiment.

FIG. 5 shows a flow chart illustrating a method 500 that may be included in a method of communicating a data packet according to an embodiment. In some embodiments, one or more of the processes 510-560 of method 500 may be implemented, at least in part, in the form of executable code stored on non-transient, tangible, machine readable media that when run by one or more processors, such as the one or more processors in control unit 220 of FIG. 2 and/or control unit 310 of FIG. 3, may cause the one or more processors to perform one or more of the processes 510-560. In some embodiments, method 500 may be performed in a switch, including, but not limited to, subordinate switches and port extenders. In some embodiments, method 500 may be performed by parent switch 101 and/or one or more subordinate switches 102 of FIG. 1.

At process 510, method 500 may receive a data packet from a port through a network link. At process 520, method 500 may create a header based on a communications protocol. In some embodiments the communication protocol may be based off of a standard communications protocol. In some embodiments, the communications protocol may be specifically designed for communications between switching devices such as the IEEE 802.1BR protocol. In some embodiments, process 520 may insert information that identifies the communication protocol and the port receiving the data packet into the header. In some embodiments, the information that identifies the communications protocol may be found in EtherType field 401 of FIG. 4, and the receiving port may be entered into the ingress ECID 404 and/or ingress ECID-ext 408 data field of FIG. 4.

At process 530, method 500 may check whether a rule applies to the data packet. In some embodiments, process 530 may conduct a rule check by crosschecking information related to the received data packet with one or more ACLs. The information related to the data packet may include, but is not limited to, addresses such as a receiving port, originating port, intermediate port, destination port, source protocol port, destination protocol port, destination address(es), and/or originating address(es). In some embodiments, the information may be a QoS bit, an EtherType or any other information within the data packet. In some embodiments, process 530 may retrieve the information related to the data packet through deep packet inspection, such as the deep packet inspection method discussed earlier in this disclosure.

In some embodiments of method 500, when it is determined that no rule applies, processes 540-560, below, may be skipped and the data packet may be sent to a parent switch such as parent switch 101 of FIG. 1 and/or a controlling bridge. In some embodiments, the data packet may be unchanged. In some embodiments, a header using the IEEE 802.1BR protocol may be attached. In some embodiments, process 540-560 may not be skipped.

At process 540, method 500 may insert into the header an indication as to whether the packet should be dropped or not. In some embodiments, the results of process 530 may determine whether the packet should be dropped or not. In some embodiments the indication is inserted into an unused, or unpopulated portion of a header. In some embodiments the unused portion of the header may be a field that is normally reserved for a different switch to populate. In some embodiments, the different switch may be a parent switch and/or a bridge connector. In some embodiments, the header may be based on the IEEE 802.1BR protocol, and the drop indicator may be inserted into the egress data field of the header, such as ECID 407 and/or egress ECID-ext 409 illustrated in FIG. 4. In some embodiments, the indication is inserted into the ECID 407 and/or egress ECID-ext data field because these are unpopulated until the header reaches a different switch.

At process 550, the header, including the drop indicator, is attached to the data packet recorded during process 510. In some embodiments, method 500 may create a new data packet by encapsulating the data packet received during process 510 using a communications protocol that includes the header created during process 520.

At process 560, the data packet with the header is sent to a switch. In some embodiments method 500 may send the data packet with the header to a parent switch, such as parent switch 101 of FIG. 1, and/or a controlling bridge. In some embodiments, the data packet may be sent with the header to a switch through an uplink port coupling the switch performing process 500 to another network switching device, such as a parent switch and/or a controlling bridge.

Figure 6:
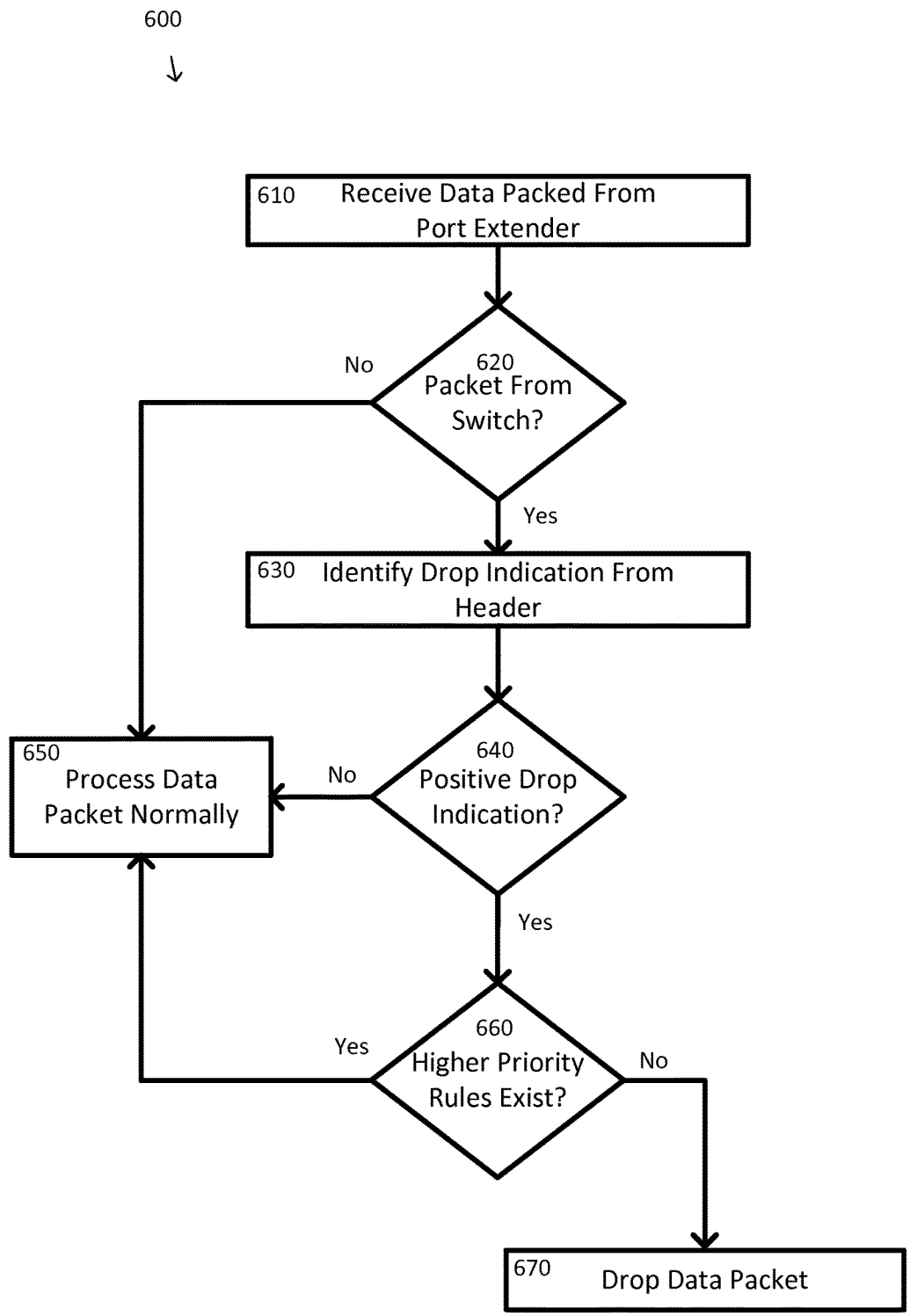
FIG. 6 shows a flow chart illustrating a method of data packet switching according to an embodiment.

FIG. 6 shows a flow chart illustrating a method 600 of data packet switching according to an embodiment. In some embodiments, one or more of the processes 610-670 of method 600 may be implemented, at least in part, in the form of executable code stored on non-transient, tangible, machine readable media that when run by one or more processors may cause the one or more processors to perform one or more of the processes 610-670. In some embodiments, method 600 may be performed in a switch, including, but not limited to, parent switches and controlling bridges. In some embodiments, parent switch 101 of FIG. 1 and/or parent switch 200 of FIG. 2 may perform method 600.

At process 610 a data packet may be received on a port. At process 620, it is determined whether the data packet is being received from a switch. In some embodiments, process 620 may determine whether the data packet is being received from a subordinate switch such as one or more subordinate switches 102. In some embodiments, method 600 may determine that the data packet is being sent by a switch from header information in the data packet. In some embodiments the header may be the IEEE 802.1BR based header illustrated in FIG. 4 and the header information may include a value of 0x893f in EtherType field 401. In some embodiments the header information may be retrieved through inspection and/or parsing of the data packet. In some embodiments, process 620 may determine whether the data packet is from a switch based on which port received the data packet. One of ordinary skill in the art would recognize that there are many methods for identifying whether a data packet is being transmitted by a switch, all of which are contemplated herein.

When it is determined that the data packet is not received from a switch and/or does not include a header based on a switch to switch communications protocol, method 600 may continue to process 650 and process the data packet in its ordinary and normal fashion. When it is determined that the data packet was received from a switch, method 600 may continue to process 630 and identify a preliminary drop indication from a header in the data packet. In some embodiments, method 600 may skip process 630 and move directly to process 640 where it checks for a preliminary drop indication in a header of the data packet.

At process 640, method 600 may determine whether the preliminary drop indicator is positive or negative. In some embodiment, when the drop indication is negative, method 600 may continue to process 650 and process the data packet in its ordinary and normal fashion.

When the drop indication is positive, method 600 may check whether any higher priority rules apply to the data packet at process 660. In some examples, this may include checking whether the destination address is present in a forwarding table. In some examples, the destination may be a multicast (multiple destinations) and method 600 may check every destination with a forwarding table.

When there are higher priority rules, method 600 may ignore the preliminary drop indicator and continue to process 650 where the data packet may be processed in its ordinary and normal fashion. In some examples, this may be forwarding the packet to an address in a forwarding table. When there are no other higher priority rules that apply to the data packet, method 600 may drop the data packet at process 670. In some embodiments, method 600 may ignore the preliminary drop indicator and continue to process 650 when there are no conflicting higher priority rules.

Some embodiment's parent switch 101, one or more subordinate switches 102, parent switch 200, and/or subordinate switch 300 may include non-transient, tangible, machine readable media that include executable code that when run by one or more processors may cause the one or more processors to perform the processes of methods 500 and/or 600 as described above. Some common forms of machine readable media that may include the processes of methods 500 and/or 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A network switching device, comprising:
a controller;
a first port coupled to the controller and configured to couple the controller to a first device using a first network link; and
a second port coupled to the controller and configured to couple the controller to a second device using a second network link, wherein the controller is configured to:
receive a data packet from the second device on the second port;
determine whether a rule applies to the data packet based on information associated with the data packet;
append a header to the data packet, wherein the header includes a field that is reserved for the first device to populate with first data, wherein the controller populates the field with second data that represents whether the rule applies to the data packet; and
provide the data packet through the first port and over the first network link to the first device.

2. The network switching device of claim 1, wherein the network switching device is a port extender.

3. The network switching device of claim 1, wherein the first device is a controlling bridge.

4. The network switching device of claim 1, wherein the first port is an uplink port.

5. The network switching device of claim 1, wherein the header is an IEEE 802.1 BR protocol header.

6. The network switching device of claim 1, wherein the rule is in an access control list.

7. The network switching device of claim 1, wherein the second data that represents whether the rule applies to the data packet is a preliminary indication to drop the data packet.

8. The network switching device of claim 1, wherein the controller is further configured to receive the rule from the first device on the first port.

9. A network switching device, comprising
a controller; and
a port coupled to the controller and configured to couple to a device using a network link;
wherein the controller is configured to:
receive a data packet through the port; and
determine that a header of the data packet includes an indication that a first rule applies to the data packet, wherein the indication is included in a field of the header that is reserved for the network switching device to populate with data; and
determine, in response to determining that the header of the data packet includes the indication that the first rule applies to the data packet, whether a second rule that has a higher priority than the first rule also applies to the data packet.

10. The network switching device of claim 9, wherein the indication that the first rule applies is a preliminary drop indicator.

11. The network switching device of claim 9, wherein the header of the data packet is a IEEE 802.1 BR protocol header.

12. The network switching device of claim 9, wherein the field that is reserved for the network switching device to populate with data is an egress extended channel identifier (ECID) field of the header that was populated by a subordinate switch.

13. The network switching device of claim 9, wherein the controller is further configured to drop the data packet when the first rule applies to the data packet and no second rule applies to the data packet.

14. The network switching device of claim 9, wherein the controller is further configured to ignore the first rule when the controller determines the second rule that has the higher priority than the first rule also applies to the data packet.

15. The network switching device of claim 9, wherein the controller is further configured to determine whether the data packet was sent by a subordinate switch.

16. The network switching device of claim 15, wherein the controller is configured to determine whether the data packet was sent by the subordinate switch by reading an EtherType data field in a header of the data packet.

17. An information handling system, comprising:
a first port of a subordinate switch coupled to a second port of a parent switch by a network link,
wherein the subordinate switch comprises:
a first controller coupled to the first port and a third port,
wherein the first controller configured to:
receive a first data packet from the third port;
identify information associated with the first data packet;
crosscheck the information with a first list;
create a header including data that represents results of the crosscheck, wherein the header includes a field that is reserved for the parent switch to populate with first data, and wherein the first controller populates the field with second data that represents the results of the crosscheck;
create a second data packet which includes the header and the first data packet; and
send the second data packet to the parent switch,
wherein the parent switch comprises:
a second controller coupled to the second port,
wherein the second controller is configured to:
receive the second data packet from the second port;
determine a preliminary drop indication is provided in the header of the second data packet, wherein the preliminary drop indication is provided by the second data in the field that is reserved for the parent switch to populate with the first data;
identify, in response to determining the preliminary drop indication is provided in the header of the second data packet, second information related to the second data packet; and
determine whether the second information is part of a second list.

18. The information handling system of claim 17, wherein the header is based off of an IEEE 802.1 BR protocol and the field of the header that is reserved for the parent switch to populate with the first data and includes the second data that represents the results of the crosscheck is an egress extended channel identifier (ECID) field or an egress ECID-ex data field.

19. The information handling system of claim 17, wherein entries of the first list and the second list are a plurality data traffic rules.

20. The information handling system of claim 19, wherein the entries of the first list and the second list are different.

* * * * *